(12) United States Patent
Borden et al.

(10) Patent No.: US 6,785,264 B1
(45) Date of Patent: Aug. 31, 2004

(54) METHOD AND APPARATUS FOR INTER-WORKING LINE SIDE SIGNALING BETWEEN CIRCUIT, PACKET AND CIRCUIT PACKET NETWORKS

(75) Inventors: J. Martin Borden, Littleton, MA (US); Arun V. Mahajan, Palo Alto, CA (US)

(73) Assignee: Tollbridge Technologies, Santa Clara, CA (US)

( * ) Notice: Subject to any disclaimer, the term of this patent is extended or adjusted under 35 U.S.C. 154(b) by 708 days.

(21) Appl. No.: 09/691,950

(22) Filed: Oct. 18, 2000

(51) Int. Cl.[7] ............................................. H04L 12/66
(52) U.S. Cl. ........................ 370/352; 370/357; 370/389
(58) Field of Search ................................. 370/469, 466, 370/352, 354, 467, 395.5, 395.52, 395.6, 395.61, 395.63, 357, 389

(56) References Cited

U.S. PATENT DOCUMENTS

| | | | | |
|---|---|---|---|---|
| 5,008,879 | A | * | 4/1991 | Fischer et al. ............... 370/401 |
| 5,826,017 | A | * | 10/1998 | Holzmann ................... 709/230 |
| 5,864,542 | A | * | 1/1999 | Gupta et al. ................. 370/257 |
| 6,075,784 | A | | 6/2000 | Frankel et al. |
| 6,097,718 | A | * | 8/2000 | Bion ........................... 370/351 |
| 6,272,129 | B1 | * | 8/2001 | Dynarski et al. ............ 370/356 |
| 6,466,571 | B1 | * | 10/2002 | Dynarski et al. ............ 370/352 |
| 6,628,671 | B1 | * | 9/2003 | Dynarski et al. ............ 370/469 |
| 6,650,635 | B1 | * | 11/2003 | Weinstein et al. ........... 370/352 |
| 2003/0095539 | A1 | * | 5/2003 | Feuer .......................... 370/352 |

OTHER PUBLICATIONS

Martin Taylor, "Baseline Text for Loop Emulation Service Using AALZ", BTD–VTOA–LES–01.05, Jan. 2000, ATM Forum Technical Committee.

Jetstream Communications, Caglan M. "Chalan" Aras, Patent Declaration US. 6,075,784, Oct. 2000, ATM Forum technical Committee.

* cited by examiner

*Primary Examiner*—Wellington Chin
*Assistant Examiner*—Jamal A. Fox
(74) *Attorney, Agent, or Firm*—Glenn Patent Group; Michael A. Glenn

(57) ABSTRACT

An inexpensive and flexible method and apparatus for inter-working in circuit, packet and circuit packet networks between one or more access protocols and one or more destination protocols. By consolidating the inter-working logic in an Abstracted Common Call Control Inter-working Function (ACCCIF) that operates on abstracted signals and events, configuration and maintenance are simplified. At the same time, extending the invention by adding, updating or deleting protocols may be achieved quickly and consistently while the need to buy additional equipment in order to extend services is minimized. A preferred embodiment utilizes protocol engines and is implemented as a finite state machine.

13 Claims, 6 Drawing Sheets

OPTIONAL STEPS

530 — A PROTOCOL ENGINE RECEIVES ONE OR MORE PACKETS, FRAMES, CELLS OR SIGNALS FROM AN ACCESS SIDE LOGICAL LINE OR LOGICAL LINE GROUP

540 — THE PROTOCOL ENGINE PROCESSES THE PACKETS, FRAMES, CELLS OR SIGNALS, TRANSLATES PROTOCOL-SPECIFIC SIGNALS, EVENTS OR DATA INTO THE ABSTRACTED COMMON CALL FORMAT AND TRANSMITS ONE OR MORE ABSTRACTED COMMON CALL FORMAT MESSAGES TO THE ACCCIF VIA AN ACCESS SIDE ROUTE

550 — ONE OR MORE ABSTRACTED COMMON CALL FORMAT MESSAGES ARE RECEIVED BY THE ACCCIF FROM AN ACCESS SIDE ROUTE

560 — THE ACCCIF OPERATES ON THE ABSTRACTED COMMON CALL MESSAGES AND TRANSMITS ONE OR MORE APPROPRIATE ABSTRACTED COMMON CALLS TO ONE OR MORE DESTINATION SIDE ROUTES ACCORDING TO THE ACCCIF CONFIGURATION

570 — A DESTINATION SIDE PROTOCOL ENGINE RECEIVES ONE OR MORE ABSTRACTED COMMON CALLS VIA A ROUTE AND TRANSMITS THE APPROPRIATE DATA, SIGNALS AND/OR EVENTS IN PROPERLY FORMATTED, PROTOCOL SPECIFIC CELLS, FRAMES, PACKETS OR SIGNALS TO ONE OR MORE DESTINATION SIDE LOGICAL LINES OR LOGICAL LINE GROUPS ACCORDING TO CONFIGURATION

OPTIONAL STEPS

*FIG. 6*

METHOD AND APPARATUS FOR INTER-WORKING LINE SIDE SIGNALING BETWEEN CIRCUIT, PACKET AND CIRCUIT PACKET NETWORKS

FIELD OF INVENTION

Invention relates to communications, particularly to inter-working between disparate access and destination protocols.

BACKGROUND OF INVENTION

Reliable, high quality telephone service and custom call features such as call forwarding, call waiting and three-way calling have become indispensable business tools. These services are commonly provided by Incumbent Local Exchange Carriers (ILECs) using expensive switches known as "class 5" switches that are located in central offices (COs). FIG. 1 illustrates an example of a typical switched circuit Public Switched Telephone Network (PSTN). An ILEC may provide both voice and data services to both small and large business customers using their legacy infrastructures. With typical legacy equipment, an ILEC, may provide voice services using a circuit-switched model where a typical resource unit is a 64 Kb/s circuit allocated on a one-for-one basis. In contrast, many Competitive Local Exchange Carriers (CLECs) focus on providing services over broadband networks such as Digital subscriber Lines (DSL), cable and wireless that are optimized for data transmission. With a typical CLEC, data services may be provided using a packet-based network where bandwidth efficiency may be increased. While voice services may be offered over packet-based networks, the quality of these voice services tends to be compromised in typical implementations that do not support quality of service (QoS) methods. Furthermore, profitably providing high quality telephone services and a comprehensive selection of custom call features to a variety of small and large customers has proven to be challenging for most CLECs. This is due, in part, to the complex translations and mappings that must take place to interwork between the different protocols involved.

For example, instead of implementing expensive class 5 switches to provide both data and voice services to their customers, a CLEC may choose to provide these services by establishing a gateway to the PSTN class 5 switches. This gateway may inter-work between the access protocols and the destination protocols. One approach is to use inter-working functions in conjunction with or instead of gateways. For example, the ATM Forum document "Loop Emulation Service using AAL2," af-vmoa-0145.000, July, 2000 describes inter-working between specific protocols, AAL2 to GR-303 and AAL2 to V5.2, using multiple inter-working functions. In some cases, these techniques may be used to reduce overhead and gain a competitive advantage over the CLECs by treating both voice and data traffic as data traffic and packetizing all traffic. However, using gateways and/or typical inter-working functions that may inter-work between specific access protocols and specific destination protocols may not provide sufficient flexibility. Adding flexibility to their service offerings, such as adding support for a new access protocol, or new capabilities such as dynamically choosing the most cost-effective transmission media, may require buying new equipment, such as new gateways, new software, and consistently integrating this new equipment and software into their existing infrastructure and processes. Typically, this approach is slow to implement and both difficult and expensive to maintain.

What is needed is a method and apparatus for inexpensively and flexibly inter-working in circuit, packet and circuit packet networks between one or more access protocols and one or more destination protocols.

SUMMARY OF INVENTION

It is an object of the current invention to provide an inexpensive and flexible method and apparatus for inter-working in circuit, packet and circuit packet networks between one or more access protocols and one or more destination protocols. By consolidating the inter-working logic in an Abstracted Common Call Control Inter-working Function (ACCCIF) that operates on abstracted signals and events, configuration and maintenance are simplified. At the same time, extending the invention by adding, updating or deleting protocols may be achieved quickly and consistently while the need to buy additional equipment in order to extend services is minimized.

In a preferred embodiment of the current invention, the ACCCIF is coupled to one or more protocol engines. The ACCCIF receives abstracted signals or events from one or more protocol engines and transmits abstracted signals or events to one or more protocol engines. In this configuration, the protocol engines may transform the signals, events and data that conform to a particular protocol into standardized, abstracted signals or events for processing by the ACCCIF. Similarly, the protocol engines may transform standardized, abstracted signals, events and data received from the ACCCIF into packets, cells, frames or signals compliant with a particular protocol for transmission.

In a preferred embodiment of the current invention, the ACCCIF may be implemented wholly or in part using a finite state machine.

Optionally, the invention may support local, remote, automated or manual configuration.

Advantageously, the current invention enables service providers to provide inexpensive, robust, extensible, comprehensive, integrated voice and data broadband services in a timely manner.

BRIEF DESCRIPTION OF DRAWINGS

FIG. 6 is a high-level process flow diagram illustrating a process for inter-working line side signaling between circuit, packet and circuit packet networks.

DETAILED DESCRIPTION OF PREFERRED EMBODIMENT

Figure 1:
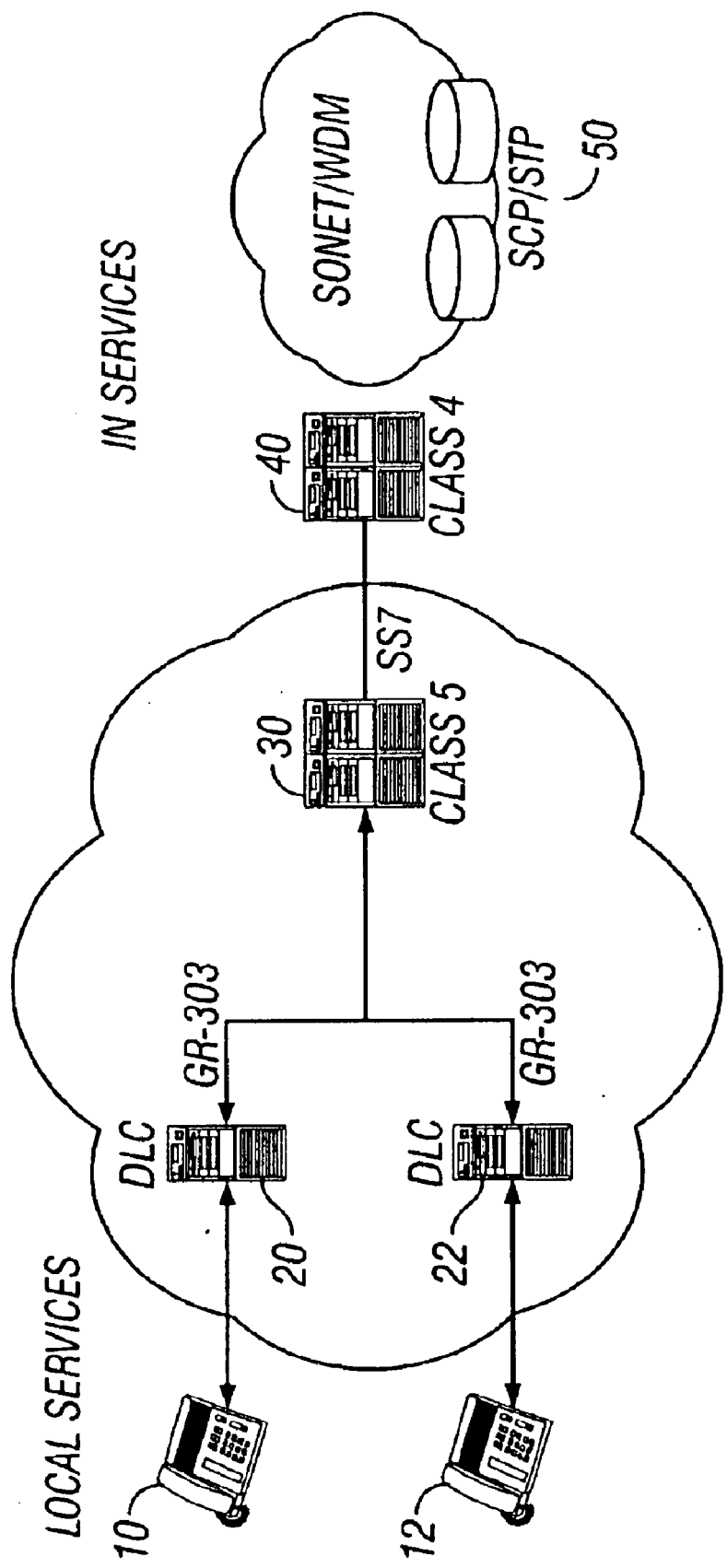
FIG. 1 illustrates an example of a typical Public Switched Telephone Network (PSTN).
Figure 2:
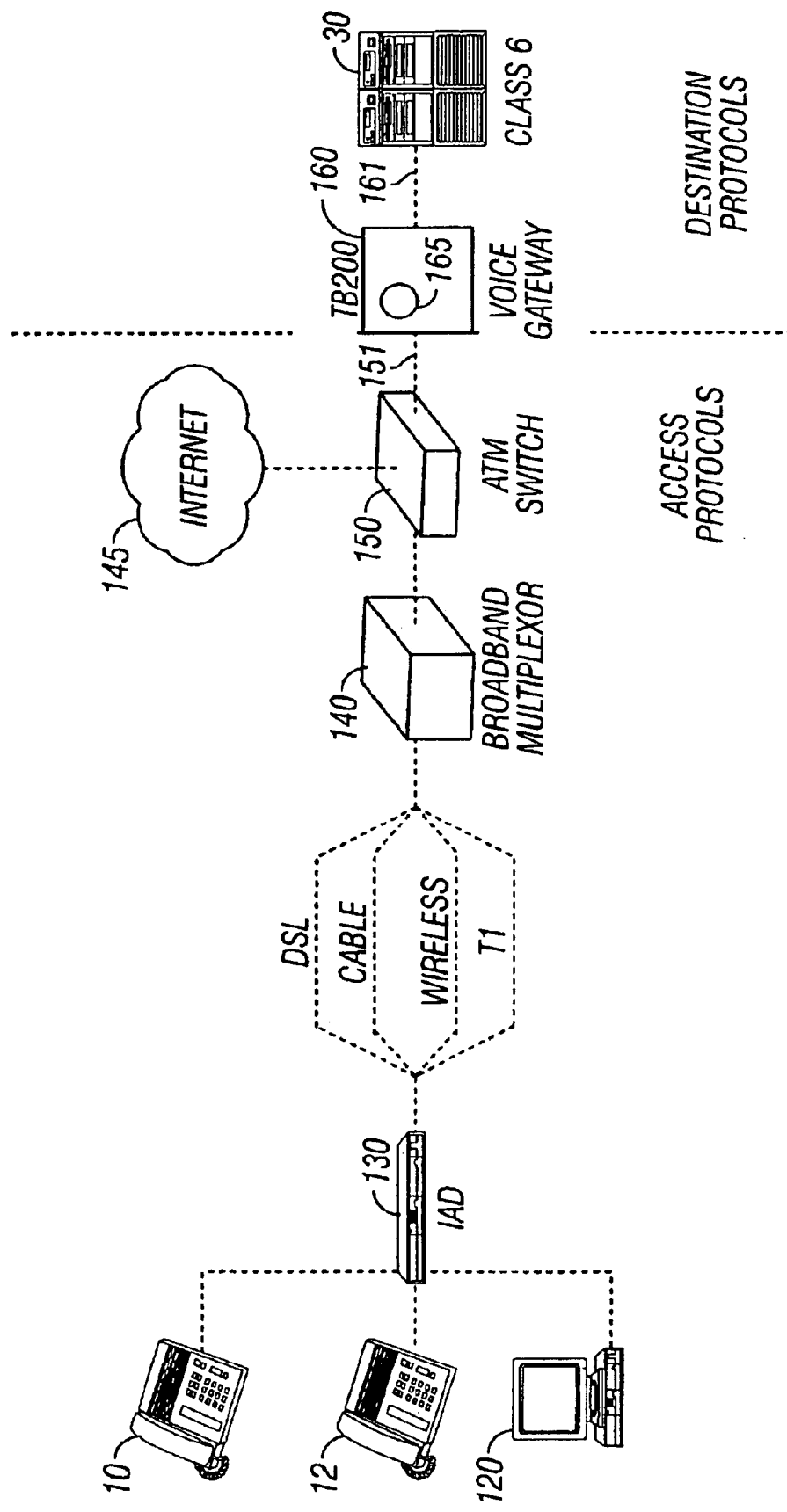
FIG. 2 illustrates an embodiment of the current invention in a broadband access network for inter-working line side signaling between circuit, packet and circuit packet networks.

FIG. 2 illustrates an embodiment of the current invention in a broadband access network for inter-working line side signaling between circuit, packet and circuit packet networks. In this example, the current invention 165 is a component of the voice gateway 160. In typical embodiments, the current invention 165 may comprise software, hardware, or firmware elements. The current invention 165 may be, used to inter-work between one or more access protocols and one or more destination protocols. In this example, one or more destination protocols may be supported by the class 5 switch 30. However, this invention may be integrated into systems comprising any type of switch. For example, the switch may be a "softswitch", a switch implemented in hardware, software and/or firmware, or an abstraction of a class 5 switch. In this example, one or more access protocols may be supported by network elements such as the internet access device (IAD) 130, the broadband multiplexor 140 and the ATM switch 150. These network elements may manage bandwidth that corresponds to multiple phone lines or endpoint channels. Typically, an endpoint, such as a computer with a modem 120 or telephones 10 or 12, operates over one or more endpoint channels or phone lines.

Examples of typical access protocols supported by various embodiments of the current invention include proprietary protocols such as Tollbridge Technology's IP-encapsulated FRF.11 packet protocol (see TR-036 Requirements for Voice over DSL, The DSL Forum) as well as standard protocols such as AAL2 (ITU-T I.363.2 B-ISDN ATM Adaptation Layer Specification: Type 2AAL), NCS (Packet Cable Network-based Call Signaling Protocol Specification PKT-SP-EC-MGCP-I02-991201, December 1999), MGCP (Media Gateway Control Protocol, Architecture and Requirements IETF RFC 2805, April 2000), SIP (Session Initiation Protocol, IETF RFC 2543, March 1999) and RTP/RTCP( RTP: A Transport Protocol for Real-Time Applications RFC 1889, January 1996). Examples of typical destination protocols supported by various embodiments of the current invention include GR-303 (Integrated Digital Loop Carrier System Generic Requirements, Objectives and Interface GR-303-CORE), V5.X variants such as V5.1 and V5.2 (ITU-T G.964, G.965), SS7 (ITU Common Channel Signaling System Number 7), MGCP, H.248 (ITU-T Recommendation H.248) and SIP (Session Initiation Protocol IETF RFC 2543 March 1999). Currently, in the United States, most class 5 switches support the GR-303 protocol, while the V5.2 protocol is more popular in Europe.

Figure 3:
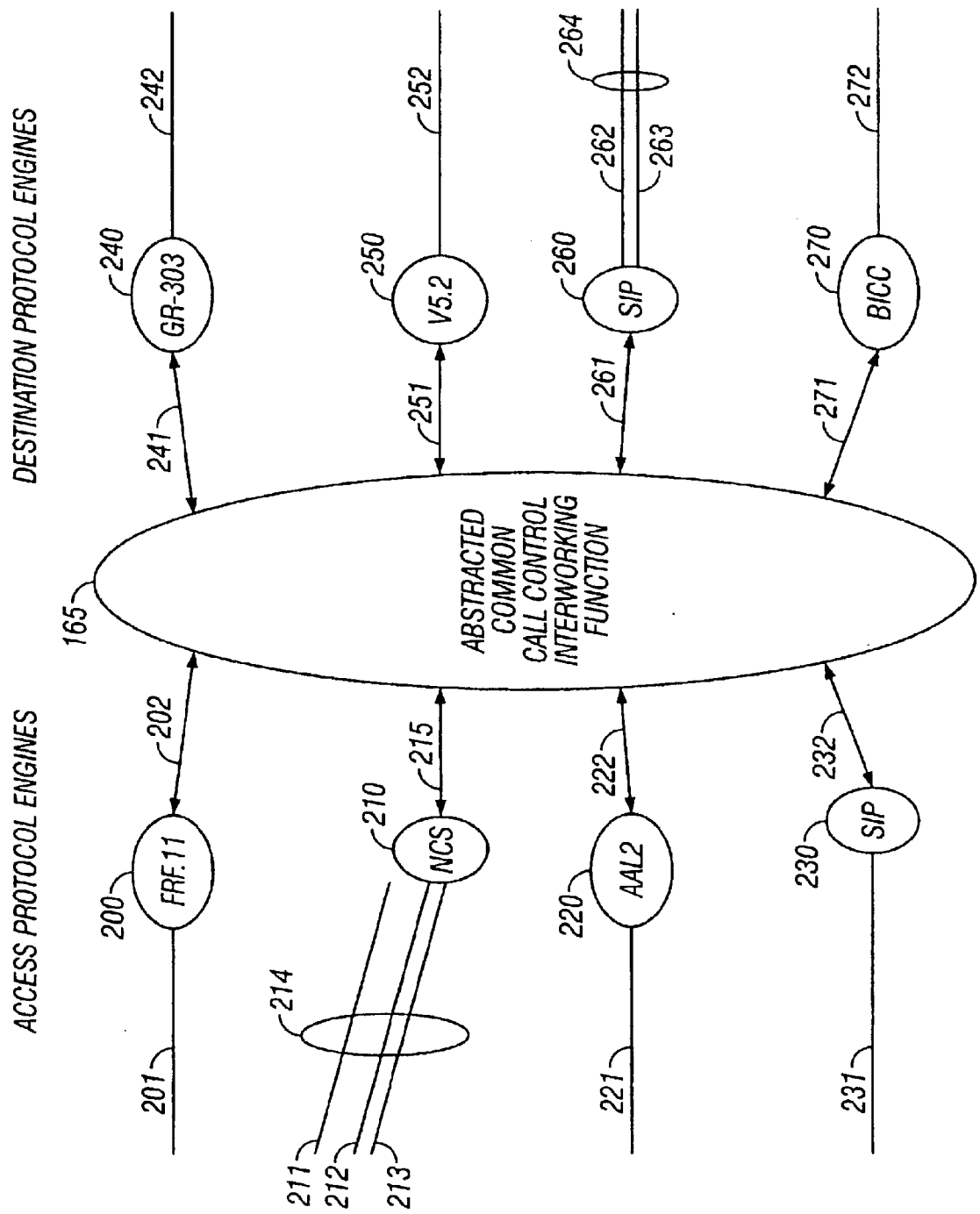
FIG. 3 illustrates an example of an Abstracted Common Call Control Inter-working Function (ACCCIF).

FIG. 3 illustrates an example of an Abstracted Common Call Control Inter-working Function (ACCCIF) 165. Typical call control inter-working functions may inter-work between one access protocol and one destination protocol requiring a separate inter-working function for each pair of access and destination protocols. However, the ACCCIF 165 illustrated in FIG. 3 can be implemented to inter-work between multiple pairs of access and destination protocols. Consolidating the logic to support one or more pairs of access and destination protocols in a single function simplifies the consistent implementation, maintenance and extension of the function. In a preferred implementation of the current invention, the ACCCIF is implemented using an event driven, finite state machine.

Figure 4:
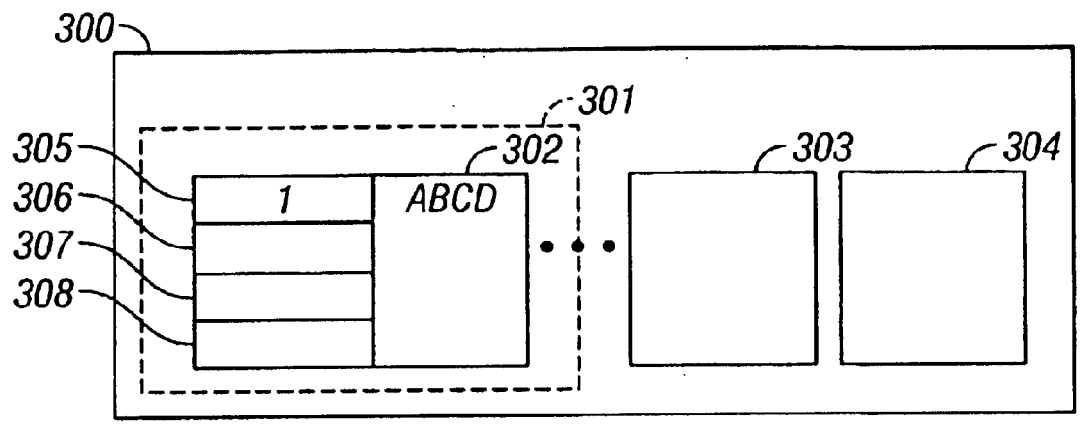
FIG. 4 illustrates three protocol specific implementations of the off-hook event.
Figure 4:
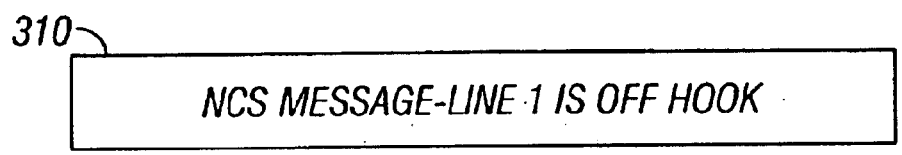
Figure 4:
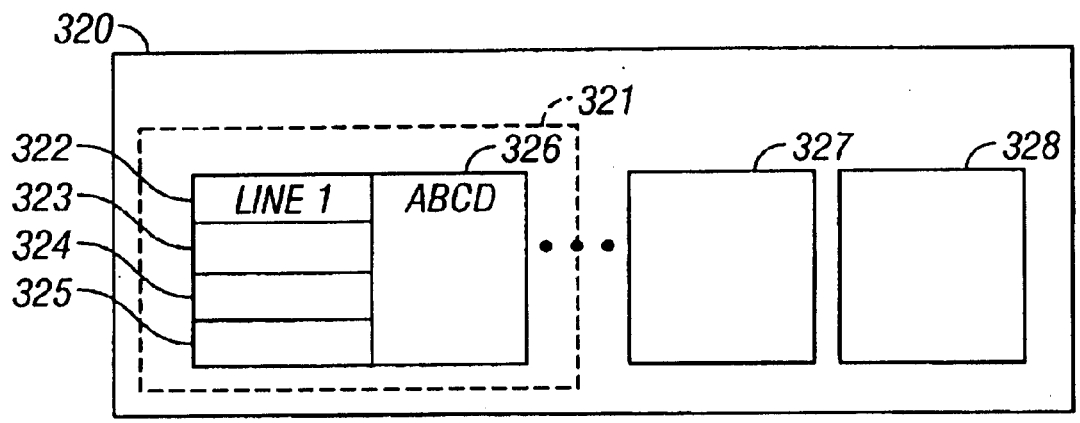

In a preferred embodiment of the current invention, ACCCIF 165 operates on abstracted events and signals. For example, in the telephone industry, when a telephone user lifts the receiver, a signal indicating that the receiver is off the hook may be sent. This may be called an offHook event. The offHook event has been implemented in many protocols. FIG. 4 illustrates three protocol specific implementations of the offHook event. According to the FRF.11 implementation, events such as the offhook event may be packaged into a packet or cell such as IP packet 300. The packet or frame may comprise one or more sub-packets or sub-frames. In this example, sub-packets 301, 303, and 304 are illustrated. IP sub-packet 301 includes a header comprised of fields 305, 306, 307 and 308. In this example, header field 305 contains information indicating the line number of the phone line sending the off hook event. Subpacket 301 also comprises a data field 302 indicating the ABCD bits that signal an offHook event.

According to the NCS protocol, a message 310 is sent declaring line 1 off hook.

According to the AAL2 protocol, events such as the offHook event may be packaged into a packet or frame such as packet 320. The packet or frame may comprise one or more sub-frames. In this example, sub-packet 321 includes a header field 322 providing the line number for the line sending the off hook event and a data field 326 providing the ABCD bits indicating an offHook event. Alternatively, the contents of fields 321 and 326 may be re-packaged into one or more ATM cells for transmission according to the AAL2 protocol.

All three of the examples illustrated in FIG. 4 use some way to indicate the line number of interest as well as identify the standard offHook event. However, the means of packaging this information and the format for transmission vary according to the protocol used. A standardized abstracted offHook event suitable for use with the ACCCIF 165 includes standard information such as the line number of interest and an off hook event indicator. In a preferred implementation, a protocol engine such as engines 200, 210, 220, 230, 240, 250, 260, or 270 receives protocol specific packets, cells, frames or signals and transmits abstracted signals, events or data to the ACCCIF 165. In a preferred implementation, a protocol engine may also receive abstracted signals, events or data and transmit protocol specific packets, cells, frames or signals. Commonly, a protocol engine would operate on either the destination side or the access side, as illustrated in FIG. 3. However, configurations including one or more protocol engines that operate on both the access side and the destination side are possible. For example, the SIP protocol is used on the access side and the destination side in some phone systems. A single SIP protocol engine could be implemented to provide service on both sides of the ACCCIF.

In FIG. 3, traffic comprising abstracted events, signals and data is carried between a preferred implementation of the ACCCIF 165 and one or more protocol engines 200, 210, 220, 230, 240, 250, 260 and 270 along routes 202, 215, 222, 232, 241, 251, 261, and 271. Traffic is carried to and from the protocol engines on logical lines such as 201, 21 1, 212, 213, 221, 231, 242, 252, 262, 263 and 272. A logical line may correspond to physical lines interconnecting systems such as the physical lines 151 and 161 depicted in FIG. 2. However,-in some examples, a single physical line may carry one or more logical lines and/or a logical line may comprise one or more physical lines. A logical line may carry a single type of traffic. For example, logical line 201 carries FRF.11 traffic. Typically, a logical line comprises one or more endpoint channels.

Typically, all of the traffic on an individual logical line on the access side is configured to be inter-worked to a single, configured protocol on a logical line on the destination side. However, more complex or dynamic configurations are possible. For example, each logical line typically carries one or more endpoint channels. An individual phone line is a common example of an endpoint channel. An independent inter-working configuration could be maintained for each endpoint channel or phone line. Furthermore, each endpoint channel or logical line could be dynamically configured such that the inter-working configuration could be dynamically changed. For example, this might be useful if a CLEC decides to dynamically change routing based on the availability or cost associated with certain lines. In various embodiments of the current invention, the protocol engines may be configurable.

Similarly, it is typical for all of the traffic on an individual logical line on the destination side to be configured to inter-work to a single, configured protocol on a logical line on the access side. For example, in FIG. 3, all of the FRF.11 traffic on access line 201 may be configured to be inter-worked to the GR-303 protocol on line 242. However, as above, more complex and dynamic configurations are possible such as the independent configuration of each endpoint channel or logical line.

A logical line may be independently deployed and configured. As described above, each endpoint channel may be configured independently. However, in a preferred embodiment of the current invention, one or more logical lines may be grouped into logical groups for common configuration and administration purposes. For example, in a preferred embodiment of the of the current invention, logical protocol lines 211, 212, and 213 may be grouped together in to logical access line group 214. Similarly, in a preferred embodiment of the current invention, logical protocol lines 261 and 262 may be grouped together into logical line group 264. In this example, logical line group 214 may be configured to inter-work with logical line group 264. In this example, the ACCCIF 165 would be configured to inter-work between the NCS access protocol and the SIP destination protocol. In some cases, the configuration of a logical line group may address some but not all of the configurable parameters. For example, in some cases, a group configuration may be used, but the partial individual configuration of a specific line may over-ride the group configuration.

In a preferred embodiment of the current invention, protocol-specific traffic flows to and from the protocol engines on logical lines 201, 211, 212, 213, 221, 231, 242, 252, 262, 263 and 272. For example, line 201 carries FRF.11 traffic to and from the FRF.11 protocol engine. In this example, abstracted signals and events flow to and from the ACCCIF 165 on routes 202, 215, 222, 232, 241, 251, 261 and 271.

In a preferred embodiment of the current invention, the ACCCIF 165 may be configured. In some cases, configuration of the current invention may comprise one or more protocol engine configurations. Typically, the ACCCIF 165 would be pre-configured before initial deployment of the invention. Once deployed, a preferred embodiment of the current invention may be reconfigured at any time. In various embodiments of the current invention, re-configuration may be done locally, remotely, manually, or automatically. In some embodiments of the current invention, the protocol engines may be configured through configuration of the ACCCIF 165. Examples of re-configuring the current invention may comprise adding, changing or deleting protocols or protocol engines.

Figure 5:
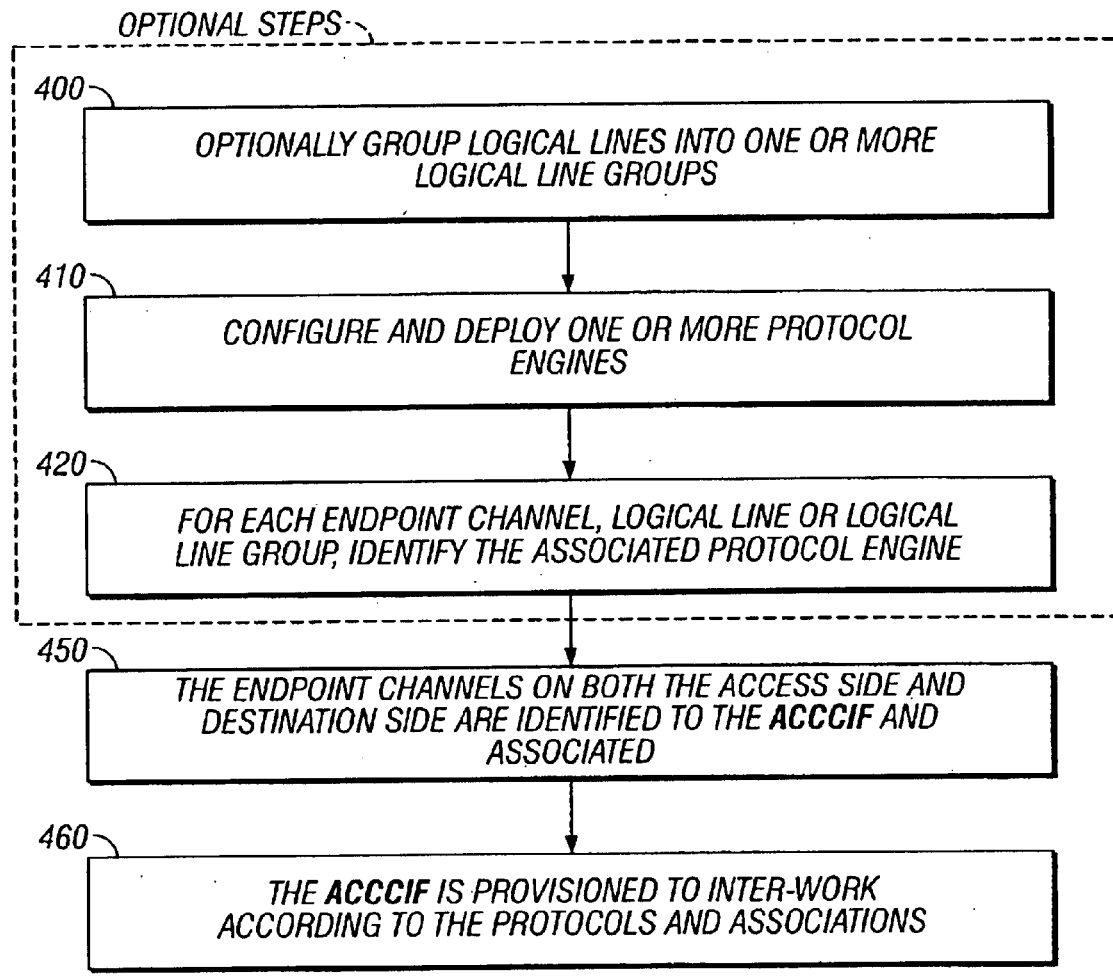
FIG. 5 is a high-level process flow diagram illustrating a process for configuring inter-working line side signaling between circuit, packet and circuit packet networks.

FIG. 5 is a high-level process flow diagram illustrating a process for configuring inter-working line side signaling between circuit, packet and circuit packet networks. The process begins when the endpoint channels on both the access side and destination side are identified to the ACCCIF and associated (step 450). Identifying an endpoint channel to the ACCCIF may comprise associating the endpoint channel with a protocol. Associating an endpoint channel may comprise identifying one or more endpoint channels that may be inter-worked with the first endpoint channel. For example, one example of an endpoint channel is an individual telephone line. Identifying and associating an endpoint channel may comprise instructing the ACCCIF that the telephone line identified with phone number 415-555-1212 should be associated with access protocol FRF.11 and destination protocol GR-303 and may be inter-worked to one or more identified destination endpoint channels. In cases where protocol engines are used, the identification and/or association of one or more endpoint channels may take place in the configuration of the protocol engine.

Associating an access side endpoint channel with one or more destination side endpoint channels enables the ACCCIF to transmit abstracted common call messages between the associated channels. For example, if an offHook event originating from an access side endpoint channel is transmitted to the ACCCIF, it may transmit a line request message for ultimate delivery to an associated endpoint channel on the destination side. Typically, one or more access side endpoint channels are associated with more than one destination side channel. For example, a bank of telephones on the access side may be associated with a set of destination side phone lines. In this example, when one of the phones in the bank of phones goes offHook, one of the phone lines on the destination side may be provided by the ACCCIF to initiate a phone call. A phone in the phone bank may be provided with access to a different destination side endpoint channel within an associated set of endpoint channels on the destination side every time it goes offHook.

Next, the ACCCIF is provisioned to inter-work according to the protocols and associations (Step 460). In this step, the ACCCIF is configured to inter-work between the identified protocols. For example, the ACCCIF operates on abstracted common calls. The implementation of a new feature or a new protocol with an extended feature set may require the ACCCIF to operate on new or different abstracted common calls. This step addresses the introduction of new or altered common calls to the ACCCIF as well as the decommissioning of obsolete abstracted common calls.

In a preferred process, the ACCCIF may be configured in association with one or more protocol engines. One or more of the optional steps in FIG. 5 may be included to incorporate the use of protocol engines. This process begins with an optional step wherein one or more logical lines are grouped into one or more logical line groups (step 400). A logical line comprises one or more endpoint channels. In some examples, the number of logical lines on the destination side may match the number of logical lines on the access side. However, in other examples, there may be a different number of logical lines on the access and destination sides. Likewise, in systems that comprise logical line groups, the number of logical line groups one the access side may or may not match the number of logical line groups on the destination side. Configure and deploy one or more protocol engines (Step 410). Typically, one or more protocol engines would be deployed on the access side and one or more protocol engines would be deployed on the destination side. However, other configurations are possible, such as deploying more complex protocol engines that may service both the access and destination side. Configuring a protocol engine may comprise identifying one or more routes to the ACCCIF. For each endpoint channel, logical line or logical line group, identify the associated protocol engine (Step 420). From this step, the process follows the general process steps 450 and 460 described above.

FIG. 6 is a high-level process flow diagram illustrating a process for inter-working line side signaling between circuit, packet and circuit packet networks. In this example, the data or signal transmission is initialized from the access protocol side. However, the current invention supports data transmission or signaling initiated from the access protocol or the destination protocol side. The process begins when abstracted common call format messages are received by the ACCCIF from an access route (step 550). The ACCCIF operates on the abstracted common call messages and transmits one or more appropriate abstracted common calls to one or more destination routes according to the ACCCIF configuration (step 560). For example, an incoming abstracted common call indicating an offhook signal might cause the ACCCIF to generate an outgoing abstracted common call indicating a line request via the appropriate destination route. Optionally, steps 530, 540 and 570 illustrate a preferred process incorporating the activities of protocol engines in the inter-working process. The preferred process for inter-working line side signaling between circuit, packet and circuit packet networks begins when a protocol engine receives one or more packets, frames, cells or signals from an access side logical line or logical line group (Step 530). The protocol engine processes the packets, frames, cells or signals and translates protocol-specific signals, events or data into an abstracted common call format and transmits the abstracted common call format messages to the ACCCIF via an access side route (Step 540). Abstracted common call format messages are received by the ACCCIF from an access side route (Step 550). The ACCCIF operates on the abstracted common call messages and transmits one or more appropriate abstracted common calls to one or more destination routes according to the ACCCIF configuration (step 560). A destination side protocol engine receives one or more abstracted common calls via a route and transmits the appropriate data, signals and/or events in properly formatted, protocol-specific cells, frames, packets or signals to one or more destination side logical lines or logical line groups according to configuration (Step 570).

The foregoing described embodiments of the invention are provided as illustrations and descriptions. They are not intended to limit the invention to precise form described. In particular, the Applicant contemplates that functional implementation of invention described herein may be implemented equivalently in hardware, software, firmware, or other available functional components or building blocks. Furthermore, while a preferred embodiment of the current invention may be implemented as an event-driven, finite state machine, other implementations are possible. Also, the process steps describing the methods may be re-arranged and/or re-ordered. Other variations and embodiments are possible in light of above teachings, and it is thus intended that the scope of invention not be limited by this Detailed Description, but rather by Claims following.

What is claimed is:

1. An apparatus for inter-working line side signaling between circuit, packet and circuit packet networks comprising an Abstracted Common Call Control Inter-working Function (ACCCIF) for inter-working between one or more access protocols and one or more destination protocols.

2. The apparatus of claim 1 further comprising one or more protocol engines coupled to said Abstracted Common Call Control Inter-working Function.

3. The apparatus of claim 2 wherein said one or more protocol engines receive one or more packets, frames, cells or signals and transmit one or more abstracted common calls comprising one or more signaling events or data.

4. The apparatus of claim 2 wherein said one or more protocol engines receive one or more abstracted common calls comprising one or more signaling events or data and transmit one or more packets, frames, cells or signals.

5. The apparatus of claim 2 wherein said one or more protocol engines are coupled to one or more logical data lines carrying one or more signals, frames, cells or packets.

6. The apparatus of claim 5 wherein two or more of said one or more logical data lines may be grouped into one or more commonly configured logical data line groups.

7. The apparatus of claim 2 wherein said one or more protocol engines support one or more protocols comprising: IP-encapsulated FRF.11 packets, AAL1, AAL2, NCS, MGCP, RTP/RTCP, SIP, GR-303, versions of V5.x including V5.1 or V5.2, SS7, H.248, IP-encapsulated RTP, IP-encapsulated compressed RTP or IP-encapsulated multiplexed compressed RTP.

8. The apparatus of claim 1 wherein said apparatus is manually, automatically, locally or remotely re-configurable.

9. The apparatus of claim 1 wherein said abstracted common call control inter-working function is implemented as a finite state machine.

10. A method for inter-working line side signaling between circuit, packet and circuit packet networks comprising the steps of:

receiving abstracted signal events or data;

processing abstracted signal events or data using an abstracted common call control inter-working function; and, transmitting abstracted signal events or data.

11. The method of claim 10 wherein the Abstracted Common Call Control Inter-working function is based on a finite state machine.

12. The method of claim 10 wherein said abstracted signal events or data are received from or transmitted to one or more protocol engines.

13. A system for inter-working line side signaling between circuit, packet and circuit packet networks comprising an Abstracted Common Call Control Inter-working Function (ACCCIF).

\* \* \* \* \*